United States Patent
Grinnall et al.

(10) Patent No.: US 7,182,905 B2
(45) Date of Patent: Feb. 27, 2007

(54) BLOW MOLDED ARTICLE WITH RETAINING FEATURE AND METHOD OF CREATING SAME

(75) Inventors: Michael Grinnall, Clinton, IA (US); Duane Franzen, Albany, IL (US); Terry Lucky, Camanche, IA (US)

(73) Assignee: Custom-Pak, Inc, Clinton, IA (US)

( * ) Notice: Subject to any disclaimer, the term of this patent is extended or adjusted under 35 U.S.C. 154(b) by 0 days.

(21) Appl. No.: 11/255,342

(22) Filed: Oct. 21, 2005

(65) Prior Publication Data

US 2006/0033245 A1    Feb. 16, 2006

Related U.S. Application Data

(62) Division of application No. 10/288,002, filed on Nov. 5, 2002, now Pat. No. 6,988,633.

(60) Provisional application No. 60/351,333, filed on Nov. 13, 2001, provisional application No. 60/335,386, filed on Nov. 15, 2001.

(51) Int. Cl.
  *B29C 49/54* (2006.01)
(52) U.S. Cl. .................... 264/531; 29/525.01
(58) Field of Classification Search ............. 264/531; 29/525.01
  See application file for complete search history.

(56) References Cited

U.S. PATENT DOCUMENTS

| | | | |
|---|---|---|---|
| 3,339,781 A | 9/1967 | Carlconfer et al. | 206/592 |
| RE31,086 E | 11/1982 | Johnson et al. | 220/840 |
| 4,522,312 A | 6/1985 | Rathgeber et al. | 220/324 |
| 4,819,827 A | 4/1989 | DiSesa | 220/318 |
| 5,288,453 A * | 2/1994 | Rutenbeck et al. | 264/531 |
| 6,022,638 A | 2/2000 | Horton et al. | 429/187 |
| 6,152,317 A | 11/2000 | Newby, Sr. | 220/4.22 |
| 6,325,962 B1 | 12/2001 | Kmiecik et al. | 264/523 |
| 6,381,819 B1 | 5/2002 | Newby | 29/11 |
| 6,808,674 B1 * | 10/2004 | Skov | 264/516 |

* cited by examiner

Primary Examiner—Suzanne E. McDowell
(74) Attorney, Agent, or Firm—St. Onge Steward Johnston & Reens LLC

(57) ABSTRACT

A blow molded article includes an outer wall and an article retaining feature projecting outwardly therefrom. The article retaining feature includes a distal wall and a side wall connecting the distal wall and the outer wall of the blow molded article. The side wall is generally orthogonal to the outer wall of the blow molded article, and an inner surface is defined at least partially by inner edges of the side wall, the distal wall and the outer wall of the blow molded article. The side wall has a hole integrally molded therein.

5 Claims, 3 Drawing Sheets

BLOW MOLDED ARTICLE WITH RETAINING FEATURE AND METHOD OF CREATING SAME

RELATED APPLICATIONS

This patent application is a divisional of currently U.S. patent application Ser. No. 10/288,002, filed Nov. 5, 2002, now U.S. Pat. No. 6,988,633 which application claims the benefit of, under Title 35, United States Code, Section 119(e), U.S. Provisional Patent Application No. 60/351,333, filed Nov. 13, 2001 and U.S. Provisional Patent Application No. 60/335,386, filed Nov. 15, 2001.

FIELD OF THE INVENTION

The present invention relates to an improved retaining feature which can be incorporated into a double wall blow molded article to retain accessories, such as handles, on the article and a method of molding an article having such a retaining feature.

BACKGROUND OF THE INVENTION

Double wall blow molded articles, such as carrying cases, have been known for decades. Such articles provide a useful combination of desirable properties, such as having high strength and relatively light weight, at a modest cost. It has also long been known to provide retaining features in or on such double wall blow molded articles in order to retain accessories, such as handles or the like, on or in the article. However, while the art of blow molded articles, including blow molded articles provided with retaining features, is well developed, deficiencies still exist.

One of such deficiencies relates to the manner in which accessories which are not an integral part of the blow molded article are retained thereby. While numerous such retaining features are known, they suffer from a number of disadvantages, such as being complex, and therefore expensive to produce and/or difficult to mold, and/or not being strong enough to support the blow molded article (particularly when the blow molded article comprises a case in which heavy objects are carried).

Another deficiency of known retaining features relates to the method in which they are created. Typically, retaining features for accessories which are not an integral part of the blow molded article require that various secondary operations be performed after the article is blow molded. Examples of such secondary operations include drilling, punching, etc. A disadvantage of requiring such secondary features is that they add to the complexity and cost of manufacturing the blow-molded article.

What is desired, therefore, is a blow molded article which includes a retaining feature which is simple and inexpensive to produce, which provides a relatively high strength connection between the blow molded article and the accessory, such as a handle, and which is formed during the molding process, without the need for secondary operations.

SUMMARY OF THE INVENTION

Accordingly, it is an object of the present invention to provide a blow molded article which includes a retaining feature which is simple and inexpensive to produce.

Another object of the present invention is to provide a blow molded article which includes a retaining feature having the above characteristics and which provides a relatively high strength connection between the blow molded article and the accessory, such as a handle.

A further object of the present invention is to provide a blow molded article which includes a retaining feature having the above characteristics and which is formed during the molding process, without the need for secondary operations.

These and other objects of the present invention are achieved by provision of a blow molded article comprising an outer wall and an article retaining feature projecting outwardly therefrom. The article retaining feature includes a distal wall and a side wall connecting the distal wall and the outer wall of the blow molded article. The side wall is generally orthogonal to the outer wall of the blow molded article, and an inner surface is defined at least partially by inner edges of the side wall, the distal wall and the outer wall of the blow molded article. The side wall has a hole integrally molded therein.

Preferably, the article retaining feature projects outwardly and upwardly from a top surface of the outer wall of the blow molded article. The hole in the side wall is preferably located proximate to the distal wall, and most preferably adjacent to the inner surface such that a thin bridge of material connects the distal wall and the outer wall of the blow molded article. In one embodiment, the article retaining feature comprises two generally parallel and spaced apart side walls, each having a hole therein, and a handle having a longitudinal center portion and a leg portion protecting from each end thereof is provided. Each of the leg portions includes a pin projecting inwardly therefrom, with each of the pins of the handle being received in the hole in each of the side walls.

In another respect, the present invention is directed to a method of creating a blow molded article having a retaining feature. A first mold half is provided having a protrusion extending from an inner surface thereof, the protrusion having a protuberance extending therefrom in a direction generally parallel to the inner surface, the protuberance having a generally planar face and being spaced apart from the inner surface so as to define a space therebetween. A second mold half is also provided having a generally planar side wall generally parallel to the generally planar face of the protuberance. The first mold half and the second mold half are brought together with a molten parison disposed therebetween such that the generally planar face of the protuberance of the first mold half abuts the generally planar side wall of the second mold half and such that the parison flows into a cavity defined by the space between the protuberance and the inner surface of the first mold half and the generally planar side wall of the second mold half in order to form a wall having an integrally molded hole separated from an edge thereof by a thin bridge of material.

Preferably, the molten parison is allowed to at least partially solidify and the at least partially solidified parison is removed from the mold by elastically deforming the bridge of material around the protuberance. The first mold half may include two protrusions, each having a protuberance facing in opposite directions and the second mold half may include two generally planar side walls such that two walls are formed, each having an integrally molded hole separated from an edge thereof by a thin bridge of material. When such is the case, the method may further comprise the steps of providing a handle having a longitudinal center portion and a leg portion protecting from each end thereof, each of the leg portions having a pin projecting inwardly therefrom, and inserting each of the pins of the handle into one of the holes.

In another respect, the present invention is directed to a mold for creating a blow molded article having a retaining feature. The mold may include a first mold half having a protrusion extending from an inner surface thereof, the protrusion having a protuberance extending therefrom in a direction generally parallel to the inner surface, the protuberance having a generally planar face and being spaced apart from the inner surface so as to define a space therebetween. A second mold half includes a generally planar side wall generally parallel to the generally planar face of the protuberance. When the first mold half and the second mold half are brought together with a molten parison disposed therebetween, the generally planar face of the protuberance of the first mold half abuts the generally planar side wall of the second mold half such that the parison flows into a cavity defined by the space between the protuberance and the inner surface of the first mold half and the generally planar side wall of the second mold half in order to form a wall having an integrally molded hole separated from an edge thereof by a thin bridge of material.

In one embodiment the first mold half includes two protrusions, each having a protuberance facing in opposite directions, and the second mold half includes two generally planar side walls. When such is the case, when the first mold half and the second mold half are brought together with a molten parison disposed therebetween two walls are formed, each having an integrally molded hole separated from an edge thereof by a thin bridge of material.

The invention and its particular features and advantages will become more apparent from the following detailed description considered with reference to the accompanying drawings.

DETAILED DESCRIPTION OF AN EMBODIMENT OF THE INVENTION

Figure 1:
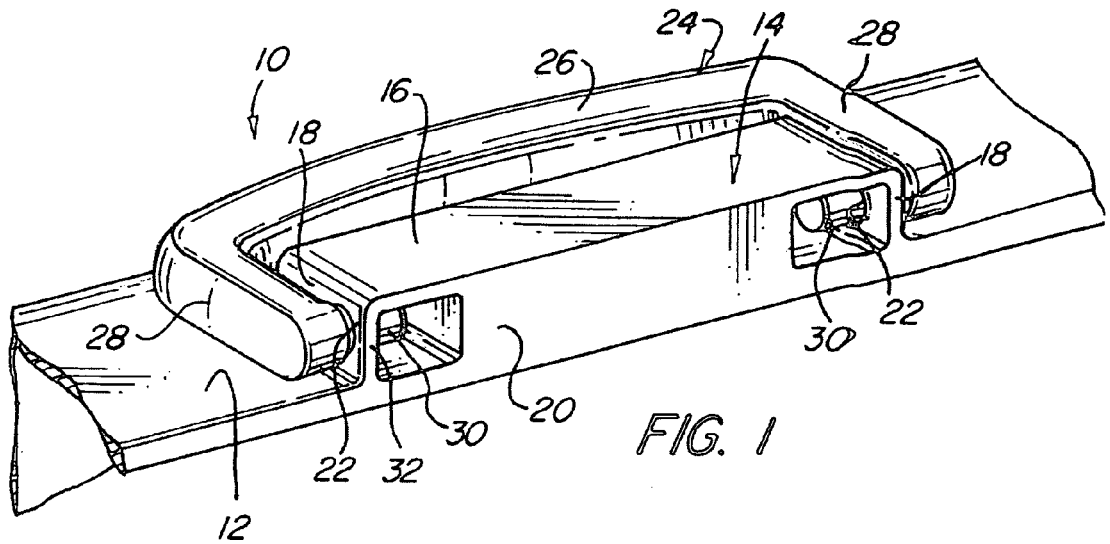
FIG. 1 is an isometric side view of an embodiment of a blow molded article which includes a retaining feature in accordance with the present invention.
Figure 2:
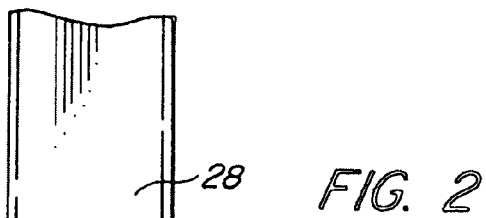
FIG. 2 is an enlarged side plan view of the blow molded article which includes a retaining feature of FIG. 1.

Referring first to FIGS. 1 and 2, a blow molded article 10 having an outer wall 12 and an article retaining feature 14 projecting outwardly therefrom in accordance with one embodiment of the invention is shown. Blow molded article 10 may comprise any of a number of articles such as tool boxes, carrying cases for various articles, etc. In the Figures, blow molded article 10 comprises a carrying case with article retaining feature 14 projecting from a top surface thereof. However, it should be understood that article retaining feature 14 could project outwardly from a lower surface and/or side surfaces of blow molded article 10 instead of or in addition to projecting from the top surface thereof. It should also be understood that when directional references, such as "top," "bottom," "upper," "lower," "side," etc., are made herein such references are directed to the orientation shown in the Figures. However, it is expressly contemplated that the orientation of blow molded article 10 could be varied and is not limited to the orientation shown in the Figures.

Article retaining feature 14 includes a distal wall 16 and two side walls 18 connecting distal wall 16 and outer wall 12 of blow molded article 10. Side walls 18 are generally parallel and are generally orthogonal to outer wall 12 and distal wall 16. An inner surface 20 is defined at least partially by inner edges of side walls 18, distal wall 16 and outer wall 12.

Each of side walls 18 has a hole 22 integrally molded therein, as described more fully below. A handle 24 having a longitudinal center portion 26 and a leg portion 28 projecting from each end thereof is provided. Each of leg portions 28 includes a pin 30 projecting inwardly therefrom, with each of pins 30 of the handle being received in hole 22 in each of side walls 18. Side walls 18 are spaced apart a distance smaller than the distance separating leg portions 28 of handle 24, but greater than the distance separating the inner most extents of pins 30 of handle 24. As will be understood by those skilled in the art, handle 24 can thus be installed on retaining feature 14 by elastically stretching leg portions 28 apart, positioning pins 30 proximate to holes 22, and then allowing leg portions 28 to return to their original positions with pins 30 retained in holes 22.

Holes 22 are preferably located proximate to distal wall 16. This is desirable so that the weight of article 10 on handle 24 is not borne solely by holes 22. Rather, as best seen in FIG. 2, by locating holes 22 proximate to distal wall 16, pins 30 can abut distal wall 16, thereby allowing distal wall 16 to bear at least some of the weight of article 10 on handle 24.

It is also preferable that holes 22 be located adjacent to inner surface 20 such that a relatively thin bridge of material 32 connects distal wall 16 and outer wall 12. This is desirable to facilitate removal of blow molded article 10 from the mold during manufacture, as if a thicker portion of material separated hole 22 and inner surface 20, it may be difficult to remove blow molded article 10 from the mold, as more fully described below.

Figure 3:
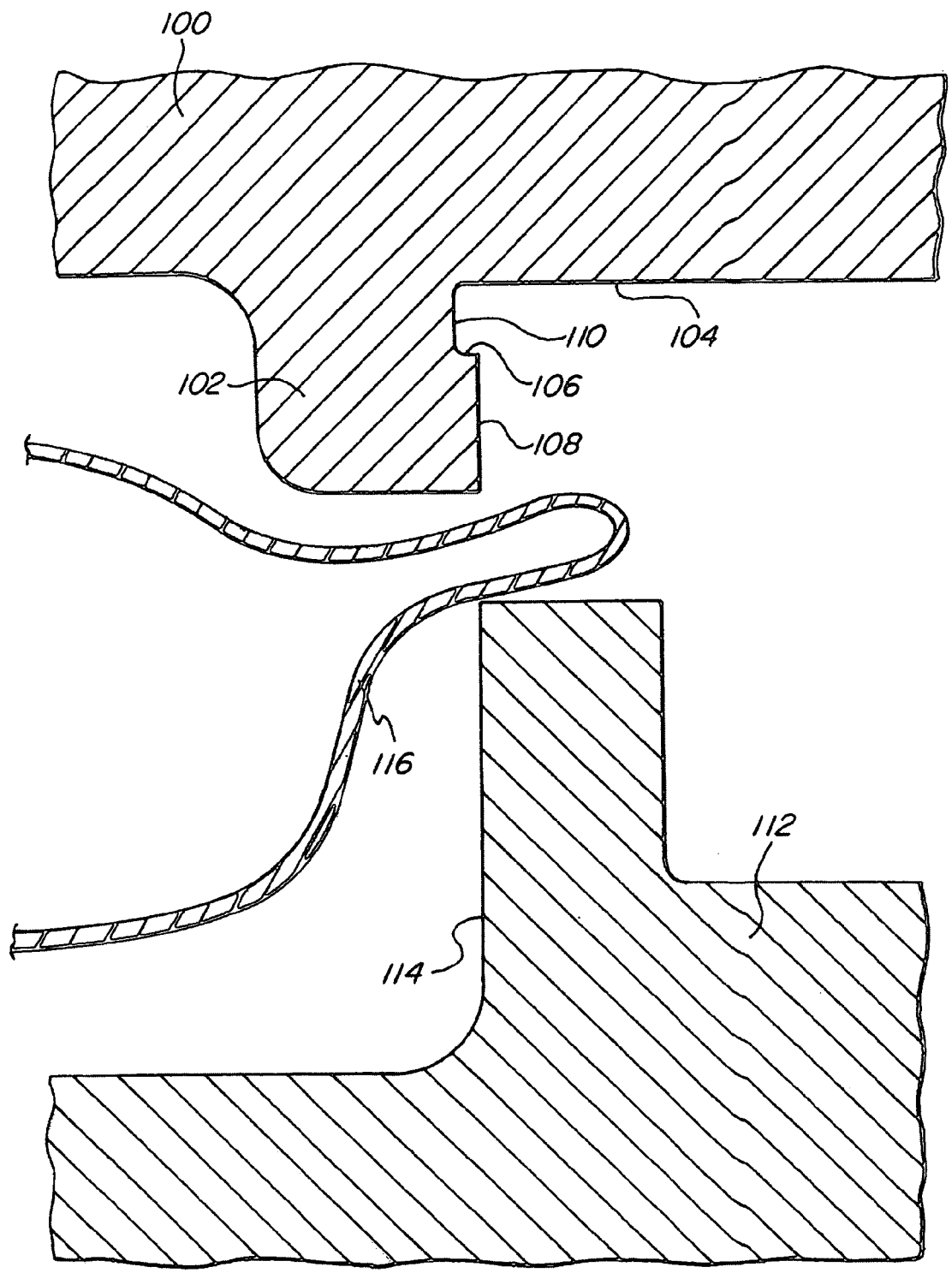
FIG. 3 is a partially cross-sectional view illustrating an embodiment of a molding process used to create the blow molded article which includes a retaining feature of FIG. 1 shown with the mold in an open position; and, FIG. 4 is a partially cross-sectional view illustrating the molding process of FIG. 3 shown with the mold in a closed position.
Figure 4:
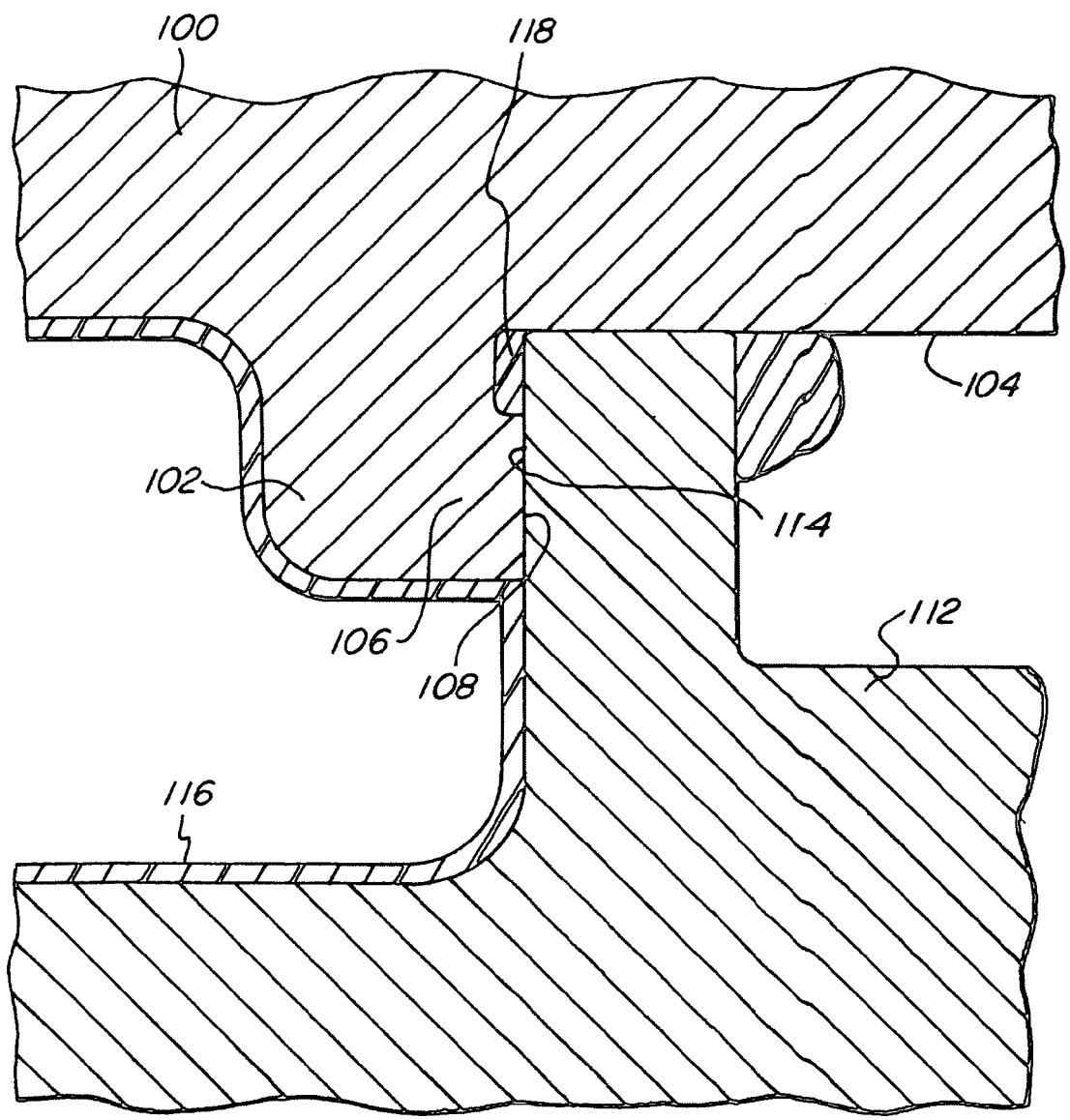

Referring now to FIGS. 3 and 4 a method of creating blow molded article 10 and molds used to create blow molded article 10 are shown. A first mold half 100 is provided having a protrusion 102 extending from an inner surface 104 thereof. Protrusion 102 has a protuberance 106 extending therefrom in a direction generally parallel to inner surface 104. Protuberance 106 has a generally planar face 108 and is spaced apart from inner surface 104 so as to define a space 110 therebetween. A second mold half 112 is also provided having a generally planar side wall 114 generally parallel to generally planar face 108 of protuberance 106.

First mold half 100 and second mold half 112 are brought together with a molten parison 116 disposed therebetween such that generally planar face 108 of protuberance 106 of first mold half 100 abuts generally planar side wall 114 of second mold half 112 (best seen in FIG. 4). As first mold half 100 and second mold half 112 are brought together to the closed position shown in FIG. 4, parison 116 flows into a cavity 118 defined by space 110 between protuberance 106 and inner surface 104 of first mold half 100 and generally planar side wall 114 of second mold half 112 in order to form side wall 18 having integrally molded hole 22 separated from an edge thereof by a thin bridge of material 32 (shown in FIGS. 1 and 2). Because generally planar face 108 of protuberance 106 of first mold half 100 abuts generally planar side wall 114 of second mold half 112, the molten parison 116 in that area is compressed out of the area such that no parison (or only an extremely thin layer of the parison) remains in this area, thereby creating a hole.

Air or some other pressurized fluid may then be introduced into parison 116 in order to cause parison 116 to conform to the shape of the mold 100, 112 as is known in the art. Preferably, molten parison 116 is allowed to at least partially solidify before being removed from the mold by elastically deforming bridge of material 32 around protuberance 106.

When article retaining feature 14 is used to retain a handle 24, it is desirable for article retaining feature 14 to include two generally parallel side walls 18 each having a hole 22 integrally molded therein. When such is the case, first mold half 100 may include two protrusions 102 (arranged essentially in a mirror image to the one shown in FIGS. 3 and 4), each having a protuberance 106 facing in opposite directions and the second mold half 112 may include two generally planar side walls 114 such that two walls 18 are formed, each having an integrally molded hole 22 separated from an edge thereof by a thin bridge of material 32.

When such is the case, a handle 24 as described above may be provided. Handle 24 may be installed by inserting each of pins 30 of handle 24 into one of holes 22.

The present invention, therefore, provides a blow molded article which includes a retaining feature which is simple and inexpensive to produce, which provides a relatively high strength connection between the blow molded article and the accessory, such as a handle, and which is formed during the molding process, without the need for secondary operations.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of creating a blow molded article having a retaining feature comprising the steps of:
    providing a first mold half having a protrusion extending from an inner surface thereof, the protrusion having a protuberance extending therefrom in a direction generally parallel to the inner surface, the protuberance having a generally planar face and being spaced apart from the inner surface so as to define a space therebetween;
    providing a second mold half having a generally planar side wall generally parallel to the generally planar face of the protuberance; and
    bringing the first mold half and the second mold half together with a molten parison disposed therebetween such that the generally planar face of the protuberance of the first mold half abuts the generally planar side wall of the second mold half and such that the parison flows into a cavity defined by the space between the protuberance and the inner surface of the first mold half and the generally planar side wall of the second mold half in order to form a wall having an integrally molded hole separated from an edge thereof by a thin bridge of material.

2. The method of claim 1 further comprising the steps of:
    allowing the molten parison to at least partially solidify; and
    removing the at least partially solidified parison from the mold by elastically deforming the bridge of material around the protuberance.

3. The method of claim 1 wherein the first mold half includes two protrusions, each having a protuberance facing in opposite directions, wherein the second mold half includes two generally planar side walls, and wherein two walls are formed, each having an integrally molded hole separated from an edge thereof by a thin bridge of material.

4. The method of claim 3 further comprising the steps of:
    providing a handle having a longitudinal center portion and a leg portion protecting from each end thereof, each of the leg portions having a pin projecting inwardly therefrom; and
    inserting each of the pins of the handle into one of the holes.

5. A method of creating a blow molded article having a retaining feature comprising the steps of:
    providing a first mold half having two protrusions extending from an inner surface thereof, each of the protrusions having a protuberance extending therefrom in opposite directions generally parallel to the inner surface, each of the protuberances having a generally planar face and being spaced apart from the inner surface so as to define a space therebetween;
    providing a second mold half having two generally planar side walls generally parallel to the generally planar faces of the protuberances;
    bringing the first mold half and the second mold half together with a molten parison disposed therebetween such that the generally planar faces of the protuberances of the first mold half abut the generally planar side walls of the second mold half and such that the parison flows into cavities defined by the spaces between the protuberances and the inner surface of the first mold half and the generally planar side walls of the second mold half in order to form two walls, each having an integrally molded hole separated from an edge thereof by a thin bridge of material;
    allowing the molten parison to at least partially solidify;
    removing the at least partially solidified parison from the mold by elastically deforming the bridges of material around the protuberances;
    providing a handle having a longitudinal center portion and a leg portion protecting from each end thereof, each of the leg portions having a pin projecting therefrom; and
    inserting each of the pins of the handle into one of the holes.

* * * * *